United States Patent
Supcoe et al.

[11] Patent Number: 5,749,959
[45] Date of Patent: May 12, 1998

[54] DARK COATING WITH LOW SOLAR INFRARED ABSORBING PROPERTIES

[75] Inventors: Robert F. Supcoe; Melvin Greenberg, both of Annapolis, Md.

[73] Assignee: The United States of America as represented by the Secretary of the Navy, Washington, D.C.

[21] Appl. No.: 801,237

[22] Filed: Feb. 10, 1969

[51] Int. Cl.$^6$ ............................ C09C 1/04; H01Q 17/00
[52] U.S. Cl. ................... 106/428; 106/430; 106/440; 342/4
[58] Field of Search ........................ 106/300, 303, 106/428, 430, 440; 342/4

[56] References Cited

U.S. PATENT DOCUMENTS

| Re. 21,427 | 4/1940 | McKinney et al. | 106/300 |
| 2,793,961 | 5/1957 | Oven | 106/303 |
| 2,796,358 | 6/1957 | Foss | 106/300 |

*Primary Examiner*—Peter A. Nelson

[57] ABSTRACT

A stable dark or moderately dark opaque exterior coating constituted of pigmentations and binder materials having low solar absorbing properties capable of visual and infrared camouflage. The pigmentations and binder materials may be selected for the proper optical qualities by previous testing before mixture and application as a coating.

4 Claims, 1 Drawing Sheet

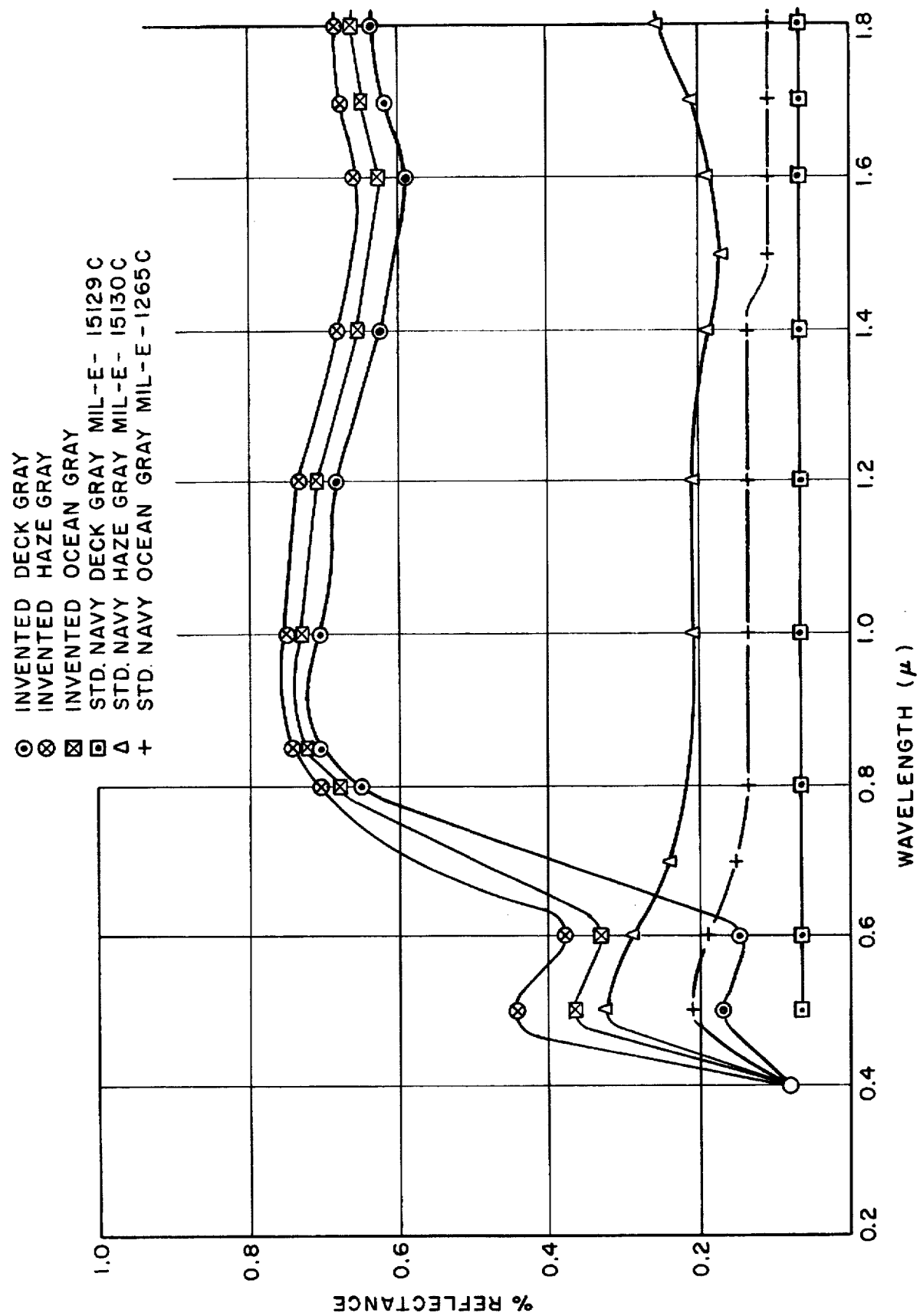

DARK COATING WITH LOW SOLAR INFRARED ABSORBING PROPERTIES

The invention described herein may be manufactured and used by or for the Government of the United States of America for governmental purposes without the payment of any royalties thereon or therefor.

BACKGROUND OF THE INVENTION

This invention relates to painted and other coatings for surfaces and in particular to paints having good visual and infrared camouflage characteristics and low solar absorption.

Previously used camouflage coatings or paints, especially for use on hulls of naval vessels, exhibit relatively high solar absorption because of the dark grey color and diffuse finish required. High solar absorption necessarily results in high surface temperatures which increase cooling requirements in temperature controlled areas and more importantly increase infrared radiation. In modern warfare infrared detection techniques have become highly developed and means for countering such detection techniques are required.

Artificial cooling of hot exposed surfaces is effective to reduce infrared emission. However, this method increases electrical power requirements aboard ship as well as adding parasitic weight and volume to equipment aboard the ship.

This invention provides a durable opaque coating, suitable for use on exposed surfaces of naval vessels, which exhibits low reflectance in the visual portion of the light wave lengths and high reflectance in the solar infrared portion. Thus the coating of this invention materially reduces surface heating, while at the same time providing protection against infrared detection and visual camouflage.

SUMMARY OF THE INVENTION

The invention described herein provides a stable dark paint or other type coating suitable for use on exterior surfaces which has a low luminous reflectance and a high solar infrared reflectance in the diffusive surface finish.

A coating having the above characteristics is produced, according to the invention, by screening and classifying of the various components used in the compounding of the coating according to the characteristics desired of the coating when applied to a surface. The most appropriate material of each required component may then be selected to insure the desired characteristics in the complete applied coating.

It is, therefore, an object of this invention to provide an exterior opaque coating having low luminous reflectance and low solar infrared absorption.

It is another object of this invention to provide a dark, or moderately dark, exterior coating having low luminous reflectance and high solar infrared reflectance, as well as visual camouflage characteristics.

It is yet another object of this invention to provide a coating having predetermined optical properties by selecting the component ingredients according to their optical properties.

BRIEF DESCRIPTION OF THE DRAWING

The sole FIGURE of the drawing is a graph of comparison of reflectance of several different legended paint coatings as a function of % reflectance vs wave length in microns. In the FIGURE the legend "invented . . ." refers to coatings of the present invention.

DESCRIPTION OF THE PREFERRED EMBODIMENT

Dark exterior paint coatings, especially those used on exterior surfaces of naval vessels, range in color from light grey to near black. In addition to providing a protective coating to prevent corrosion and similar deterioration of the metal hull, these coatings must also provide visual camouflage for vessels at sea. A dark coating having a diffuse finish to inhibit visual reflection also exhibits a high solar absorbance resulting in heating of the surface.

In modern warfare techniques one of the principal methods for detection of naval vessels is by infrared sensors. As is well known, the infrared radiation of a surface is directly affected by the surface temperature and also by the character of the surface finish.

This invention provides a painted coating and a method of making such a coating which will provide physical protection and camouflage for a vessel hull while at the same time materially reducing surface heating and infrared radiation.

The color and other optical properties of a coating are due principally to the characteristics of the pigments and fillers used in compounding the coating, to a lesser extent the binder, and negligibly by forces of other materials at about 1% by weight or less.

According to the invention, in order to compound a coating having predictable optical characteristics, pigments and fillers suitable for use in exterior paints are screened and tabulated according to four specific properties. These properties are solar absorptance index ($\alpha_s$), luminous reflectance ($\gamma$) and the tristimulus coefficients (x and y). Table I lists some of the material screened and tabulated, grouped in four darkness gradations—dark (luminous reflectance of less than 10%), moderately dark (10–50%), moderately light (50–90%), and light (above 90%).

The spectral reflectance of the component material is measured over the 0.3–1.8μ wave length. Measurements are made directly on the dry pigments and fillers as well as on cured formulated coatings. The solar absorptance and tristimulus coordinates are then calculated from the measured reflectance data.

Referring now to Table I, in the section of a darkening pigment it is desired to choose the pigment having the lowest luminous reflectance (Y) and the lowest solar absorptance index ($\alpha_s$). According to Table I, as an example, carbon black which is the presently used darkening agent would be the least desirable choice because of a high solar absorptance index although it is an efficient darkening agent.

TABLE 1

| Optical Properties of Dry Pigments and Fillers | | | | |
|---|---|---|---|---|
| Pigments and Fillers | Y% | $\alpha_s$ | X | Y |
| Dark | | | | |
| Airfloated Copper Chromite | 9.6 | 0.86 | 0.362 | 0.357 |
| Antimony Trisulfide, City Chem | 9.0 | 0.62 | 0.297 | 0.303 |
| Manganese Dioxide | 6.5 | 0.92 | 0.310 | 0.317 |
| Magnetic Iron Oxide | 5.3 | 0.95 | 0.312 | 0.314 |
| Pure Black Ferric Oxide | 3.0 | 0.97 | 0.318 | 0.317 |
| Lead Dioxide | 3.8 | 0.94 | 0.395 | 0.349 |
| Antimony Trisulfide (McGean) | 7.9 | 0.61 | 0.299 | 0.304 |
| Carbolac 1 (Carbon Black) | 0.3 | 0.998 | 0.278 | 0.276 |
| Moderately Dark | | | | |
| Lead Silico Chromate | 37.9 | 0.33 | 0.507 | 0.403 |
| Caclium Titanate | 30.0 | 0.60 | 0.342 | 0.343 |

TABLE 1-continued

Optical Properties of Dry Pigments and Fillers

| Pigments and Fillers | Y% | $\alpha_s$ | X | Y |
|---|---|---|---|---|
| Cupric Carbonate-Green | 38.8 | 0.75 | 0.259 | 0.346 |
| Atomized Aluminum 120 Reynolds | 39.0 | 0.59 | 0.312 | 0.318 |
| Aluminum Powder S791 Moderately Light | 45.3 | 0.52 | 0.311 | 0.317 |
| Attagel 40 | 67.5 | 0.30 | 0.326 | 0.334 |
| Infusorial Earth | 85.9 | 0.13 | 0.315 | 0.322 |
| ASP70 (Aluminum Silicate) | 87.8 | 0.11 | 0.315 | 0.322 |
| Barium Carbonate | 73.5 | 0.21 | 0.317 | 0.323 |
| Magox 93 (Magnesium Oxide) | 68.1 | 0.28 | 0.328 | 0.330 |
| Sparmite $B_ASO4$ | 89.8 | 0.09 | 0.312 | 0.318 |
| Silica (300 Mesh) | 67.9 | 0.29 | 0.323 | 0.329 |
| Barium Zirconate | 71.6 | 0.21 | 0.326 | 0.334 |
| Chlorinated Rubber | 87.2 | 0.11 | 0.323 | 0.330 |
| Barium Titanate | 74.2 | 0.17 | 0.321 | 0.321 |
| Cabosil M5 (Silicon Dioxide) | 86.4 | 0.26 | 0.304 | 0.312 |
| Montmorillite Clay (Bentone 27) | 83.7 | 0.14 | 0.322 | 0.327 |
| Pliolite YT | 88.6 | 0.14 | 0.317 | 0.325 |
| Aluminum Powder 40XD Reynolds | 55.2 | 0.46 | 0.307 | 0.314 |
| Zirconium Dioxide Tam | 88.5 | 0.10 | 0.314 | 0.320 |
| Sodium Ferrocyanide | 82.8 | 0.18 | 0.325 | 0.335 |
| Montmorillite Clay (Bentone 34) | 71.8 | 0.27 | 0.332 | 0.342 |
| Diglycol Stearate Light | 84.9 | 0.19 | 0.332 | 0.342 |
| Calcium Carbonate M48 Mississippi | 91.3 | 0.08 | 0.312 | 0.318 |
| Gammasperse 255 $CaCO_3$ | 90.7 | 0.09 | 0.311 | 0.317 |
| Tronox CR801 (Titanium Dioxide) | 94.2 | 0.08 | 0.311 | 0.318 |
| Antimony Trioxide | 94.3 | 0.06 | 0.312 | 0.318 |
| Zinc Oxide | 95.6 | 0.07 | 0.311 | 0.318 |
| Aluminum Stearate | 97.7 | 0.04 | 0.311 | 0.317 |
| Alloprene X20 | 93.1 | 0.08 | 0.317 | 0.324 |

The properties listed in Table I have been experimentally measured and are specific for the batch examined.

Several of the listed dark pigments are observed to be superior in the desired qualities to carbon black. However, antimony trisulfide is an excellent material in overall characteristics, having the lowest solar absorptance index with an acceptable low level of luminous reflectance.

Following the same selection procedure, the suspensoid (comprised of fillers, extenders, stabilizers, etc.) is selected according to the coating properties desired. Moderately light fillers and extenders having high reflectance between 50–90% Y and low solar absorptances are typified by attagel 40, infusorial earth, aluminous silicate barium carbonate, magnesium oxide, technical barium sulfate, silica and barium zirconate. These materials have solar absorptance values ranging from 0.105 to 0.291.

Light extenders and stabilizer having a luminous reflectance of over 90% and low solar absorptance are typified by calcium carbonate, titanium dioxide, antimony trioxide, zinc oxide and aluminum stearate.

Any suitable binder having the desired optical properties when mixed and applied with the other ingredients as a coating, may be used. In particular, alkyd resin solutions possess the desired characteristics, as well as solutions of silicone alkyd resins, phenolic resins, and long oil alkyd resins.

One aspect of the invention is now further described by way of example and not limitation, in connection with the formulation of grey enamels having properties similar to three standard shades currently used for naval vessel exterior coatings. These are 1. Enamel, ship exterior (ocean grey), MIL-E-1265C, formula 50.
2. Enamel, ship exterior (haze grey), MIL-E-15130C.
3. Enamel, ship exterior (deck grey), MIL-E-15129C.

Typical formulation of grey paints according to the invention having visual qualities similar to the above-listed standard paints is as follows:

Ballmilling of 3–24%, by weight, titanium dioxide, 0–17%, by weight, zinc oxide, 11–15%, by weight, fibrous magnesium aluminum silicate and 40–57%, by weight alkyd resin to which 1–20%, by weight, antimony trisulfide has been added. The dry ingredients are milled to a fineness of not less than 5 on the Hegman scale.

Driers are then added, comprising not more than 0.7%, by weight, and consisting of cobalt, lead and manganese naphthenates, thinners consisting of approximately equal parts of mineral spirits and xylene or toluene comprising 15–21% by weight.

There are listed in Table II specific formulations for three distinct grey paints with comparable visual and protective characteristics to the standard Navy paint coating listed above.

Comparison of the optical properties of the standard coatings with coatings of approximately the same visual appearance formulated according to the invention are presented in Table III. Comparison of the reflectance

TABLE II

| Components - Pounds/100 Gals | | | |
|---|---|---|---|
| | Haze | Ocean | Deck |
| Titanium Dioxide | 189.2 | 50.6 | 38.5 |
| Antimony Trisulfide | 49.5 | 41.7 | 89.1 |
| Asbestine 325 | 126.5 | 144.0 | 124.3 |
| Mag Sil | | | |
| Mica | 41.8 | — | — |
| Zinc Oxide | — | 206.8 | 132.0 |
| Soya Lecithin | 12.1 | — | — |
| Thixin | 3.3 | — | — |
| Alkyd Resin | 527.7 | 475.0 | 543 |
| Lead Napthenate | — | 2.64 | 2.64 |
| Calcium Napthenate | 3.3 | — | — |
| Manganese Napthenate | 2.2 | 1.21 | 1.21 |
| Cobalt Napthenate | — | 1.21 | 1.21 |
| Cobalt Octoate | 3.3 | — | — |
| Mineral Spirits | 139.7 | 177.0 | 165.0 |
| Antiskinning Agent | 1.1 | 0.11 | 0.11 |
| Dow Corning Paint Additive #1 | 0.33 | — | — | characteristics of these materials in the solar region are shown in the FIGURE.

TABLE III

| Comparison of Optical Properties of Standard and Invented Paint Coatings | | | | | | |
|---|---|---|---|---|---|---|
| | Haze Gray | | Ocean Gray | | Deck Gray | |
| | Std | New | Std | New | Std | New |
| $\alpha_s$ | 0.751 | 0.511 | 0.849 | 0.556 | 0.914 | 0.597 |
| % Y | 25.9 | 28.9 | 18.1 | 22.9 | 9.87 | 12.64 |
| x | 0.306 | 0.294 | 0.296 | 0.293 | 0.294 | 0.295 |
| μ | 0.317 | 0.301 | 0.302 | 0.299 | 0.302 | 0.297 |

As shown in the FIGURE and tabulated in Table III, the reflectances of the invented paint coatings according to the invention vary from 60–75% in the infrared solar region as compared with 5–20% for the standard paint coatings.

Paints made according to the invention were applied to the hull of a naval vessel to determine the effect of solar heating on surface temperature of exposed surfaces. Temperatures were taken simultaneously on the invented and standard coatings placed side by side on an exposed surface. In one test period the invented deck grey showed a temperature reduction of 16° F.; the invented ocean grey 20° F. and the invented haze grey was 27° F. cooler. During a three month trial period on a naval vessel in service the coatings proved durable and provided surface protection equal to that obtained by using standard paint coatings.

The invention is, of course, not limited to grey or black coatings but may be used in the production of other colored paints as well.

Typical colored pigments tested include yellow ochre, venetian red, cobalt titanate and monastral green. In producing colors other than grey and black typical formulation, according to the invention, includes by weight up to 8% of one of the above pigments, 5–24% titanium dioxide, 15–18% zinc oxide, 10–17% magnesium aluminum silicate and 39–46% resin milled to a fineness of not less than 5 on the Hegman scale. To this is added approximately 0.7% driers consisting of cobalt, lead and manganese naphthenate and 15–20% thinner consisting of mineral spirits and a hydrocarbon, xylene or toluene. The mixture may be darkened by the addition of antimony trisulfide in order to achieve the desired degree of darkness and maintain low solar absorptance.

Thus there is provided by this invention a paint coating which can be formulated in various shades of grey, suitable for visual camouflage or in light or dark colors which provides reduced solar surface heating.

In addition to use on naval vessels the invention provides an advantageous coating for automobiles, dwellings, containers, etc. in which it is desired to reduce the effects of solar heating to reduce or eliminate the need for artificial cooling apparatus.

It is therefore to be understood that the invention is not limited to the exact details shown and described for obvious modifications will occur to those skilled in the art.

What is claimed is:

1. An exterior grey paint coating mixture having low solar absorptance and low luminous reflectance comprising:

3 to 24% titanium dioxide, 0–17% zinc oxide, 11–15% fibrous magnesium aluminum silicate, approximately 40–57% alkyd resin, 1–20% antimony trisulfide, 0.7% drier comprising metallic naphthenate and 15–21% thinner having a mineral spirit base.

2. The coating mixture according to claim 1 wherein said metallic naphthenate drier comprises approximately 80% lead naphthenate, 10% cobalt naphthenate and 10% manganese naphthenate.

3. The coating mixture according to claim 2 wherein said thinner is essentially mineral spirits.

4. An exterior durable grey paint coating having low solar absorptance and low luminous reflectance comprising a mixture consisting essentially, per 100 gallons of enamel, prior to application as a coating, of 38–189 pounds of titanium dioxide
   0–207 pounds of zinc oxide
   124–144 pounds of magnesium silicate
   475–543 pounds of alkyd resin
   2.64 pounds of lead naphthenate
   1.21 pounds of cobalt
   1.21 pounds of manganese
   139–177 pounds of mineral spirit thinner
   0.11–1.1 pounds of antiskinning agent
   41–90 pounds of antimony trisulfide.

* * * * *